(12) United States Patent
Braxmeier

(10) Patent No.: US 6,212,868 B1
(45) Date of Patent: Apr. 10, 2001

(54) ARRANGEMENT FOR NON-CONTACT REVOLUTION COUNTING OF AN OPEN-END SPINNING ROTOR

(75) Inventor: Hans Braxmeier, Suessen (DE)

(73) Assignees: Fritz Stahlecker, Bad Überkingen; Hans Stahlecker, Süssen, both of (DE)

( * ) Notice: Subject to any disclaimer, the term of this patent is extended or adjusted under 35 U.S.C. 154(b) by 0 days.

(21) Appl. No.: 09/441,450

(22) Filed: Nov. 17, 1999

(30) Foreign Application Priority Data

Dec. 21, 1998 (DE) .............................................. 198 59 162

(51) Int. Cl.$^7$ .............................. G01P 3/487; D01H 4/00
(52) U.S. Cl. .................................. 57/400; 57/263; 57/264; 57/265; 57/400; 57/401; 57/404; 57/406; 57/407; 384/448; 384/549
(58) Field of Search .............................. 57/263, 264, 265, 57/400, 401, 404, 406, 407; 384/448, 549

(56) References Cited

U.S. PATENT DOCUMENTS 5,675,964 * 10/1997 Stahlecker .............................. 57/406

* cited by examiner

Primary Examiner—John J. Calvert
Assistant Examiner—Shaun R Hurley
(74) Attorney, Agent, or Firm—Evenson, McKeown, Edwards & Lenahan, P.L.L.C.

(57) ABSTRACT

The spinning rotors of open-end spinning aggregates are supported on supporting discs. For the purposes of non-contact revolution counting, a front side of a supporting disc is provided with at least one permanent magnet. A signal receiver of a maintenance device selectively arrangeable at the spinning aggregates is arranged at the permanent magnet. The distance between the permanent magnet and the signal receiver is bridged by a ferromagnetic information transmitter, which is preferably arranged on a swivelling housing section of the spinning aggregate.

21 Claims, 2 Drawing Sheets

ARRANGEMENT FOR NON-CONTACT REVOLUTION COUNTING OF AN OPEN-END SPINNING ROTOR

BACKGROUND AND SUMMARY OF THE INVENTION

This application claims the priority of German application 198 59 162.4, filed in Germany on Dec. 21, 1998, the disclosure of which is expressly incorporated by reference herein.

The present invention relates to an arrangement for non-contact revolution counting of a spinning rotor arranged in a spinning aggregate, which spinning rotor is supported on supporting discs, of which one supporting disc is provided on an end face side with at least one permanent magnet, and a signal receiver of a maintenance device arrangeable at the spinning aggregate being disposable in operable position to detect the movement of the magnet.

An arrangement of this type is prior art in U.S. Pat. No. 5,675,964. A signal generator of the maintenance device can be placed adjacent to the relevant front side of the supporting disc holding the permanent magnet at a distance of between 3 to 6 mm. This requires not only a complicated design to make the supporting disc containing the permanent magnet accessible for the signal generator from the operator's side of the spinning aggregate, but also requires a high degree of exactness as regards the dimensions, as the distance between the permanent magnet and the signal generator must be reproduced exactly from spinning aggregate to spinning aggregate.

It is an object of the present invention to make the non-contact revolution counting of the above mentioned type accessible even in the case of less accessible supporting discs, and to make it to a great extent independent of work tolerances.

This object has been achieved in accordance with the present invention in that the distance between the permanent magnet and the signal receiver is bridged by a ferromagnetic information transmitter transmitting information about magnetic forces to the signal receiver.

By means of such a ferromagnetic information transmitter, with which older spinning machines can be equipped in a modernization process, the magnetic field lines of the supporting disc located in the inside of the spinning aggregate can be "transmitted" over to the operator's side of the spinning aggregate and guided to a point which is easily accessible for the piecing device. The ferromagnetic information transmitter can be advantageously arranged at each individual spinning aggregate, whereby the distance between the permanent magnet and the information transmitter can be predetermined exactly. It is purposeful hereby to arrange the ferromagnetic information transmitter to a housing section of the spinning aggregate which can be swivelled, as such housing sections are, as a rule, the most accessible to the maintenance device.

In a further advantageous feature of preferred embodiments of the invention, the ferromagnetic information transmitter takes the form of a metal strip adapted to the contour of the swivelling housing section. The ferromagnetic information transmitter does not act as an intrusive component, and a metal strip can be easily adapted to different contours by means of deformation. It is, of course, hereby important, that the ferromagnetic information transmitter is magnetically insulated against adjacent components, insofar as these are also ferromagnetic. For this reason, on the one hand a certain distance between the ferromagnetic information transmitter and the relevant component to which it is affixed is retained, as the air gap acts to insulate, while on the other hand, liners of aluminium or plastic, for example, are applied to the contact points.

It can be provided that the signal receiver is disposed directly on the ferromagnetic information transmitter during a maintenance period according to certain preferred embodiments of the invention. Should this not be possible, however, because for example the swivelling housing section does not permit such a position, the signal receiver can comprise an induction coil surrounding an iron core according to other preferred embodiments of the invention. Thus contact between the signal receiver and the ferromagnetic information transmitter is not absolutely necessary, as the iron core can transmit the magnetic field lines at any desired point to the signal receiver, for example outside of the swivel area of a swivelling housing section. In the case of such an embodiment according to the prese nt invention, the signal receiver can be stationarily affixed to the maintenance device, so that the signal receiver does not necessarily need to be advanced to the information transmitter by means of a relative motion.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
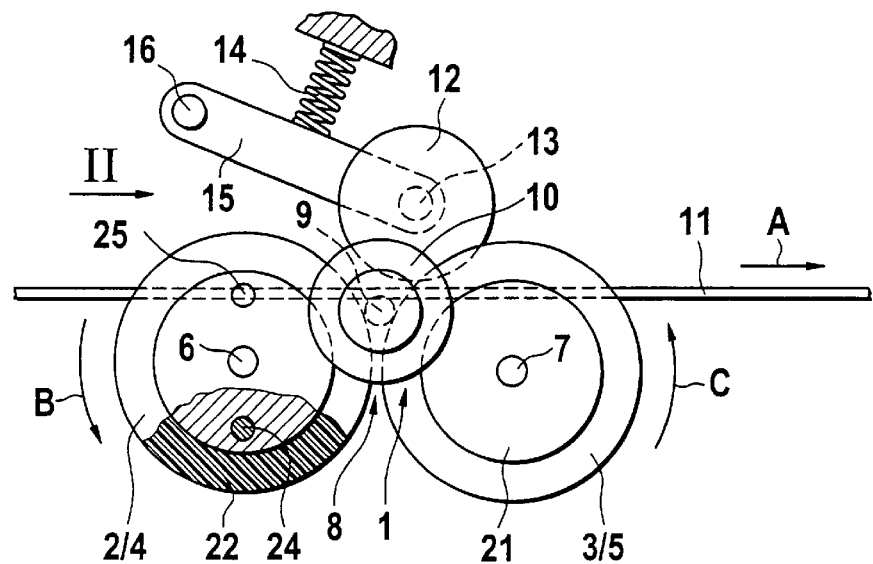
FIG. 1 is a part sectional front view of a supporting disc bearing for an open-end spinning rotor, as seen in the direction of the arrow I of FIG. 2, constructed according to a preferred embodiment of the present invention.
Figure 2:
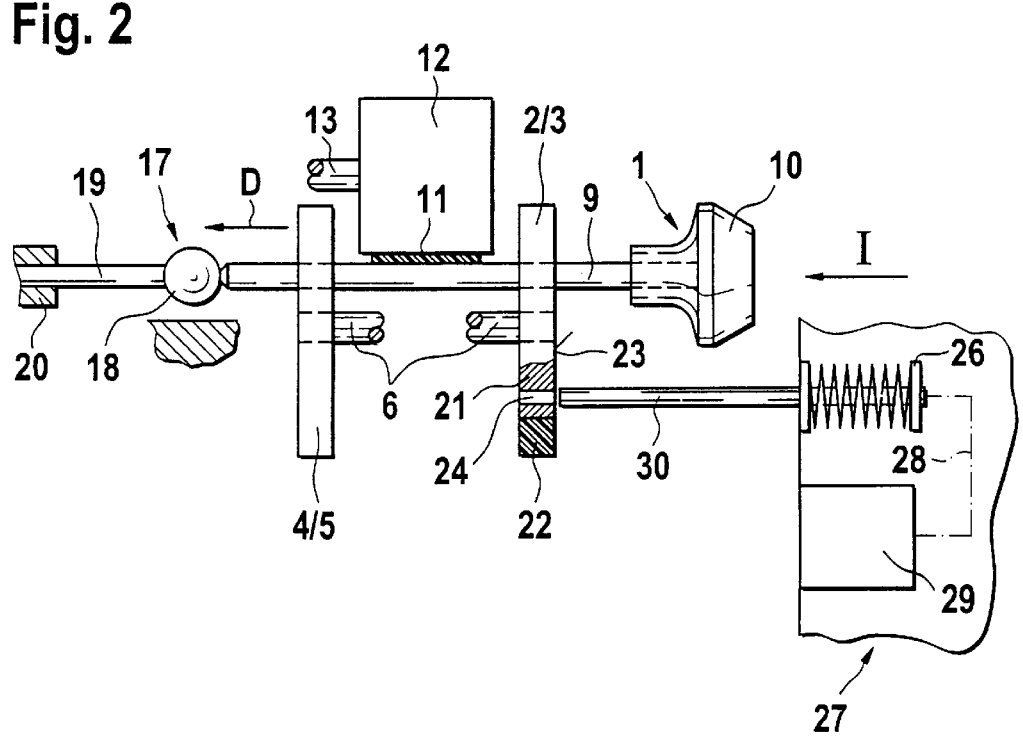
FIG. 2 is a part sectional view in the direction of the arrow II of FIG. 1, with a maintenance device comprising a signal receiver.

The supporting disc bearing shown in FIGS. 1 and 2 for a spinning rotor 1 is a component part of an open-end spinning aggregate. It comprises four supporting discs 2,3,4 and 5 altogether, which are supported on a joint shaft 6 or 7 as supporting disc pairs. The shafts 6 and 7 are supported in a way not shown in bearing housings by means of roller bearings. The supporting disc pairs are arranged in such a way that they form a wedge-shaped gap 8, in which the shaft 9 of the spinning rotor 1 is supported in radial direction.

The shaft 9 supports at its end a rotor cup 10, in whose interior the yarn formation takes place in the known way.

The shaft 9 is driven by means of a tangential belt 11, which runs between the supporting disc pairs against the shaft 9 and which holds the shaft 9 at the same time in the wedge-shaped gaps 8. The tangential belt 11 is loaded by means of a tension pulley 12 in close proximity to the shaft 9. The tension pulley 12 is supported freely rotatable around an axle 13 in a swivel arm 15 loaded by a pressing spring 14, which swivel arm 15 can be swivelled around a swivel axle 16 which extends transversely to the tangential belt 11.

The shafts 6 and 7 of the supporting disc pairs are aligned inclined at a small angle to one another in a known way such that, in connection with the travelling direction A of the tangential belt 11 by means of the rolling of the shaft 9 on the rotating supporting discs 2 to 5 according to the arrow direction B and C, an axial thrust in the direction of the arrow D is generated, which loads the shaft 9 with its free end in the direction towards a step bearing 17. The step bearing 17 comprises a ball 18 which is continuously caused to vibrate due to machine oscillations, which ball 18 is supported on the side opposite to the shaft 9 by means of a thrust bearing 19, which is arranged adjustably in a housing section 20.

Due to the machine oscillations, the ball 18 is set to vibrate with low amplitudes and high frequency, whereby due to varying supporting points, a rotation of the ball 18 around a plurality of axes occurs.

The supporting discs 2 to 5 consist each of a disc-like base body 21 as well as a plastic ring 22 connected thereto, whose peripheral surface forms the running surface for the shaft 9 of the spinning rotor 1. The base body 21 consists for this purpose of plastic or aluminum in accordance with certain preferred embodiments of the invention.

It is known that during operation spun yarn breaks due to one cause or another. In such a case an already spun yarn end must be pieced, that is, it must be connected with the fibers fed to the inside of the rotor cup 10. This occurs often during the run-up of the previously braked spinning rotor 1. It is hereby important to know at particular moments during piecing at what speed the spinning rotor 1 is rotating. This occurs in practice by means of non-contact measurement of the current speed of a supporting disc 2, which gives indirect information on the current speed of the shaft 9, supported on the supporting disc pairs, of the spinning rotor 1.

The supporting disc 2 is provided on its front (end face) side 23 facing the operator's side with two permanent magnets 24 and 25. These permanent magnets 24,25 are thin pins, which are countersunk into corresponding bore holes of the supporting disc 2. Although a single permanent magnet would be sufficient, for reasons of balance two permanent magnets 24 and 25 are advantageously provided.

When the supporting discs 2 rotate, a magnetic field is generated by means of the permanent magnets 24 and 25, which field can generate an induction current in a signal receiver 26. In the case of the signal receiver 26, an induction coil is advantageously involved. This is only schematically denoted in FIG. 2. The signal receiver 26 is a component part of a travelling maintainance device 27, which can be advanced to the maintenance catch of a spinning aggregate requiring maintenance in a known way. The signal receiver 26 is connected by means of an electric line 28 to a reading device 29, which in turn is connected to diverse control motors (not shown) of the maintenance device 27.

As it is difficult in practice to advance the signal receiver 26 of the maintenance device 27 at an exact and short distance to the permanent magnets 24 and 25, the distance between the permanent magnets 24 and 25 and the signal receiver 26 is bridged by means of a ferromagnetic adapter 30, which at the same time is an information transmitter 30, as is shown in FIG. 2 only schematically. This is explained in more detail in FIG. 3. The field lines from the permanent magnets 24 and 25 are brought over to the operator's side of the spinning aggregate by means of this ferromagnetic information transmitter 30 and are guided concentrated to a place which is freely accessible to the maintenance device 27.

Figure 3:
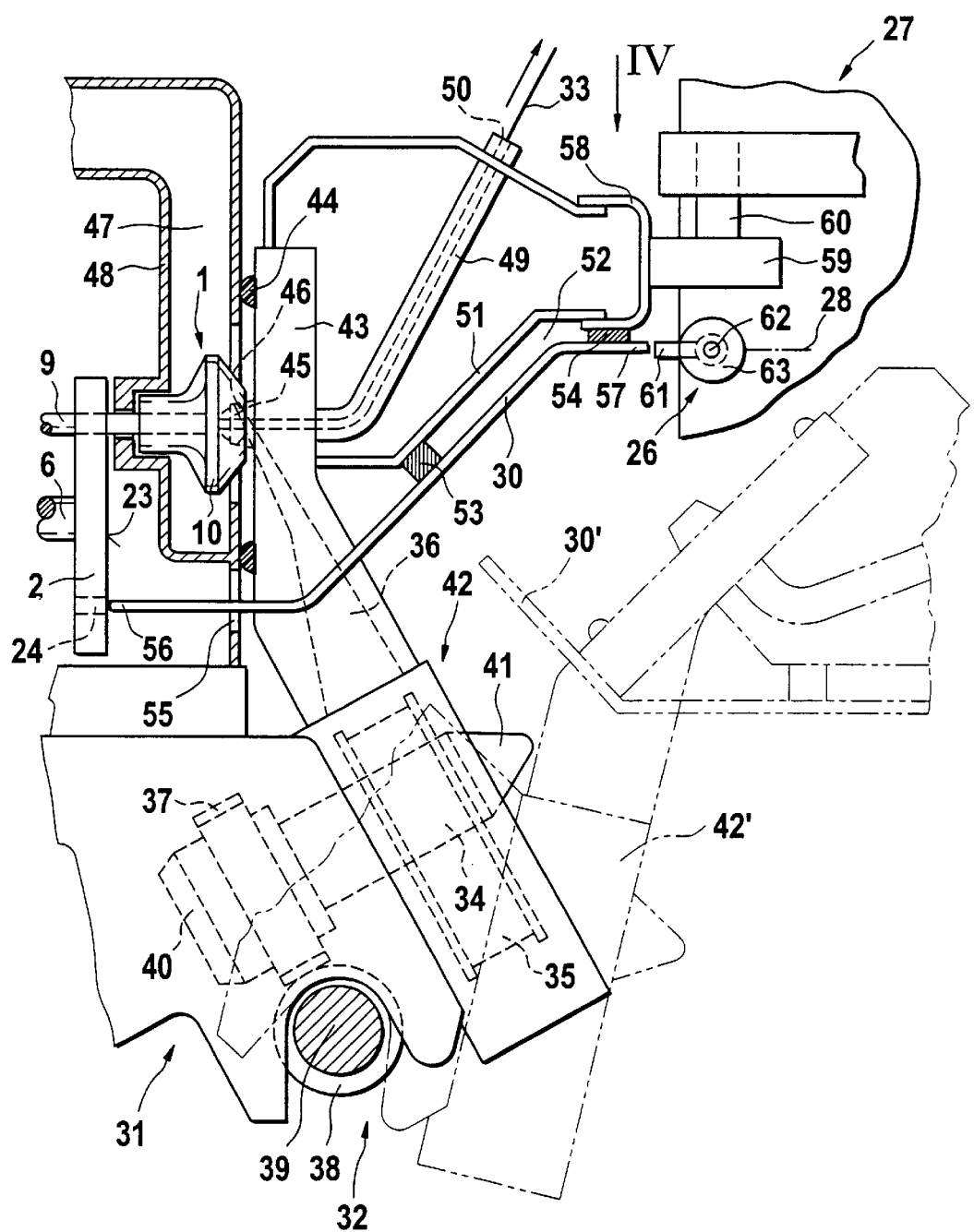
FIG. 3 is a part sectional side view of an open-end spinning aggregate comprising the present invention.

A spinning aggregate 31 is shown in the side view of FIG. 3, to which a maintenance device 27 is arranged. The spinning aggregate 31 is one of a plurality of spinning aggregates arranged adjacently to one another. There are, as a rule, at least 100 such spinning aggregates 31 on each machine side.

The spinning aggregate 31 comprises as essential components a feed and opening device 32, the above mentioned spinning rotor 1 as a twist device as well as a withdrawal device (not shown) for withdrawing the spun yarn or thread 33. The yarn 33 is fed in a way not shown to a winding device and wound so that a cross-wound package is formed.

The feed and opening device 32 comprises a feed roller 34 for feeding the fiber material (not shown), an opening roller 35 for opening this fiber material to single fibers as well as a fiber feed channel 36 for transporting the single fibers to the spinning rotor 1. This procedure is generally known in rotor spinning.

The feed roller 34 is extended in axial direction into the inside of the spinning aggregate 31 and connected to a worm wheel 37, which is driven by a worm 38. Such a worm 38 is arranged to each spinning aggregate 31, whereby all worms 38 are arranged on a drive shaft 39 which extends in machine longitudinal direction. In the area of the worm wheel 37 an electromagnetic coupling is provided, by means of which the drive of the feed roller 34 can be interrupted. By means thereof, the feed roller 34 can be brought to a standstill in the case of an end-break despite the drive shaft 39 continuing to run. The coupling 40 is controlled by an end-break detector, which is located in the area of the withdrawal device (also not shown) for the thread 33, and is connected by means of an electric line to the coupling 40.

The feed roller 34 is provided with a conical-formed drive pinion 41 towards the operator's side, by means of which drive pinion 41 the feed roller 34, when it is cut off from the machine-side drive, is temporarily driven by means of external devices of the maintenance device 27.

The opening roller 35 is provided in the known way with a toothed combing means, which combs the required single fibers from the fed fiber material. The opening roller 35 is arranged in a housing section 42 which can be swivelled away from the spinning aggregate 31, whereby the drive shaft 39 is advantageously provided as the swivel axle. The housing section 42 which can be swivelled away is extended upwards to a covering 43, with which the area of the spinning rotor 1, by means of an intermediary sealing ring 44, can be covered during operation. The covering 43 is provided with an extension 45 facing the spinning rotor 1, in which the mouth 46 of the fiber feed channel 36 is located.

As can be seen in FIG. 3, the swivelling housing section 42 can be swivelled into the position 42' denoted by a dot-dash line, The spinning rotor 1 rotates in a vacuum chamber 47, which is located in the inside of a rotor housing 48. The vacuum chamber 47 is connected to a suction device (not shown).

The withdrawal device (not shown) comprises a roller pair, by means of which the thread 33 is fed to the winding device (also not shown). A withdrawal duct 49 is part of the withdrawal device, which withdrawal duct 40 begins in the extension 45, and out of whose exit opening 50 the thread 33 exits during operation.

A metal strip is made which forms the ferromagnetic information transmitter 30 and which is bent at two points. The information transmitter 30 can thus be adapted to the contour 51 of the swivelling housing section 42 of the spinning aggregate 31. By these means, the ferromagnetic information transmitter 30 is not optically intrusive, even when installed into the spinning aggregate 31 of an older machine.

It is important to magnetically insulate the ferromagnetic information transmitter 30 against those components on which it is supported or which are disposed adjacently. This is best achieved in that an air gap 52 is left between the ferromagnetic information transmitter 30 and the relevant component. In the case of the required holding devices 53 and 54, only those which act as magnetic insulators are involved, for example those made of aluminium or plastic.

As already mentioned, the ferromagnetic information transmitter 30 is to bridge the distance between the permanent magnets 24,25 and the signal receiver 26 in a suitable way. To this end, the information transmitter 30, in the form of a metal strip, is placed through an opening 55 in an extension of the rotor housing 48. The first part 56 of the ferromagnetic information transmitter 30 can then be guided into close proximity to the permanent magnets 24 and 25 at the foremost front side 23 of the supporting disc 2. The distance, which lies in the order of magnitude of approximately 1 mm, is advantageously adjustable. The first part 56 must, of course, be disposed on the corresponding radius of the supporting disc 2.

The other end 57 of the ferromagnetic information transmitter 30 can be guided up to the outer contour of the spinning aggregate 31, namely to a point which is suitable for the signal receiver 26 applied to the maintenance device 27. In the present case, the end 57 of the ferromagnetic information transmitter 30 is disposed in close proximity to a running rail 58, on which a running wheel 59 of the maintenance device 27 is supported. An axle 60 of the running wheel 59 can be seen in FIG. 3.

It can be practical to advance the signal receiver 26 to the end 57 of the ferromagnetic information transmitter 30 in such a way that contact takes place. Should this, however, not be possible, for example because the swivelling housing section 42 does not permit it, it is then sufficient when the signal receiver 26 is advanced only in close proximity to the end 57 of the ferromagnetic information transmitter 30. In such a case it is advantageous to provide an induction coil 63 of the signal receiver 26, in which a turned-up iron core 61,62 is placed. The end 61 of the iron core is located hereby in close proximity to the end 57 of the ferromagnetic information transmitter 30.

When the ferromagnetic information transmitter 30 is affixed to the swivelling housing section 42, the information transmitter 30 is then swivelled along with the housing section 42. This is denoted in position 30' in FIG. 3 by a dot-dash line. The swivel radius must be such that the first part 56 of the ferromagnetic information transmitter 30 can be guided through the opening 55 and into the operational position in close proximity to the permanent magnets 24 and 25.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for non-contact revolution counting of a spinning rotor arranged in a spinning aggregate, which spinning rotor is supported on supporting discs, of which one disc is provided on a front side with at least one permanent magnet, and a magnet signal receiver of a maintenance device selectively positionable at the spinning aggregate, wherein the distance between the permanent magnet and the signal receiver is bridged over by means of a ferromagnetic information transmitter.

2. An arrangement according to claim 1, wherein the ferromagnetic information transmitter is arranged at the spinning aggregate.

3. An arrangement according to claim 2, wherein the ferromagnetic information transmitter is arranged on a swivelling housing section of the spinning aggregate.

4. An arrangement according to claim 3, wherein the ferromagnetic information transmitter takes the form of a metal strip adapted to the contour of the swivelling housing section.

5. An arrangement according to claim 1, wherein the ferromagnetic information transmitter is magnetically insulated against adjacent components.

6. An arrangement according to claim 2, wherein the ferromagnetic information transmitter is magnetically insulated against adjacent components.

7. An arrangement according to claim 3, wherein the ferromagnetic information transmitter is magnetically insulated against adjacent components.

8. An arrangement according to claim 4, wherein the ferromagnetic information transmitter is magnetically insulated against adjacent components.

9. An arrangement according to claim 1, wherein the signal receiver comprises an induction coil having an iron core.

10. An arrangement according to claim 2, wherein the signal receiver comprises an induction coil having an iron core.

11. An arrangement according to claim 3, wherein the signal receiver comprises an induction coil having an iron core.

12. An arrangement according to claim 4, wherein the signal receiver comprises an induction coil having an iron core.

13. An arrangement according to claim 5, wherein the signal receiver comprises an induction coil having an iron core.

14. An assembly for measuring rotational speed of an open end spinning rotor of a spinning station, comprising:
   at least one permanent magnet carried by a part of the spinning station which moves at a predetermined speed with respect to a rotational speed of a spinning station spinning rotor,
   a maintenance device selectively movable to a maintenance position adjacent the spinning station, said maintenance device including a magnetic signal receiver operable to receive magnetic signals generated by movement of the at least one magnet and representative of a rotational speed of the spinning rotor, and
   a ferromagnetic information transmitter connected with the spinning station and operable to transmit the magnetic signals from the at least one magnet to a position of the spinning station which is spaced from the at least one permanent magnet.

15. An assembly according to claim 14, wherein said ferromagnetic information transmitter is a metal strip.

16. An assembly according to claim 15, wherein said metal strip includes at least one bend.

17. An assembly according to claim 16, wherein said metal strip is fixed to a swivelling housing section of the spinning aggregate.

18. A method of refurbishing an open end spinning machine of the type having a plurality of spinning stations which each have:
   at least one permanent magnet carried by a part of the spinning station which moves at a predetermined speed with respect to a rotational speed of a spinning station spinning rotor,
   a maintenance device selectively movable to a maintenance position adjacent the spinning station, said maintenance device including a magnetic signal receiver operable to receive magnetic signals generated by movement of the at least one magnet and representative of a rotational speed of the spinning rotor, said method of refurbishing including attaching a ferromagnetic information transmitter to the spinning station to facilitate transmission of the magnetic signals from the at least one magnet to a position of the spinning station which is spaced from the at least one permanent magnet.

19. A method according to claim 18, wherein said ferromagnetic information transmitter is a metal strip.

20. A method according to claim 19, wherein said metal strip includes at least one bend.

21. A method according to claim 20, wherein said metal strip is fixed to a swivelling housing section of the spinning aggregate.

* * * * *